United States Patent [19]

Suchy

[11] 4,197,924
[45] Apr. 15, 1980

[54] BALL VALVE LUBRICATING APPARATUS

[76] Inventor: Edward C. Suchy, Box 6007, Airport Rd., Fort St. John, British Columbia, Canada, V1J 4H6

[21] Appl. No.: 919,670

[22] Filed: Jun. 27, 1978

[51] Int. Cl.² .............................................. F16N 7/02
[52] U.S. Cl. ................................. 184/65; 137/246.12; 137/246.23
[58] Field of Search .............. 137/246, 246.12, 246.14, 137/246.23; 184/65, 14, 80, 84, 86

[56] References Cited

U.S. PATENT DOCUMENTS

| | | | |
|---|---|---|---|
| 2,086,725 | 7/1937 | McCausland et al. | 137/246.23 X |
| 2,360,599 | 10/1944 | Volpin | 137/246.12 X |
| 2,918,935 | 12/1959 | Ohls | 137/246.12 X |
| 3,042,066 | 7/1962 | Wolfensperger | 137/246.12 X |
| 3,280,835 | 10/1966 | Hill et al. | 137/246.12 X |
| 3,282,287 | 11/1966 | Fowler | 137/246.14 X |
| 3,527,323 | 9/1970 | Malec | 184/65 X |

*Primary Examiner*—David H. Brown
*Attorney, Agent, or Firm*—Carver & Company

[57] ABSTRACT

Lubricating assembly for gas line ball valves in which a pressure vessel adapted to be filled with a lubricating fluid mounted above the ball valve, the pressure vessel having a descending discharge conduit ported into the valve body between spaced annular seals between which a ball valve element seats so that gas escaping from the ball valve flows into the pressurized vessel and lubricating oil flows by gravity through the conduit into the valve body.

2 Claims, 1 Drawing Figure

U.S. Patent
Apr. 15, 1980
4,197,924
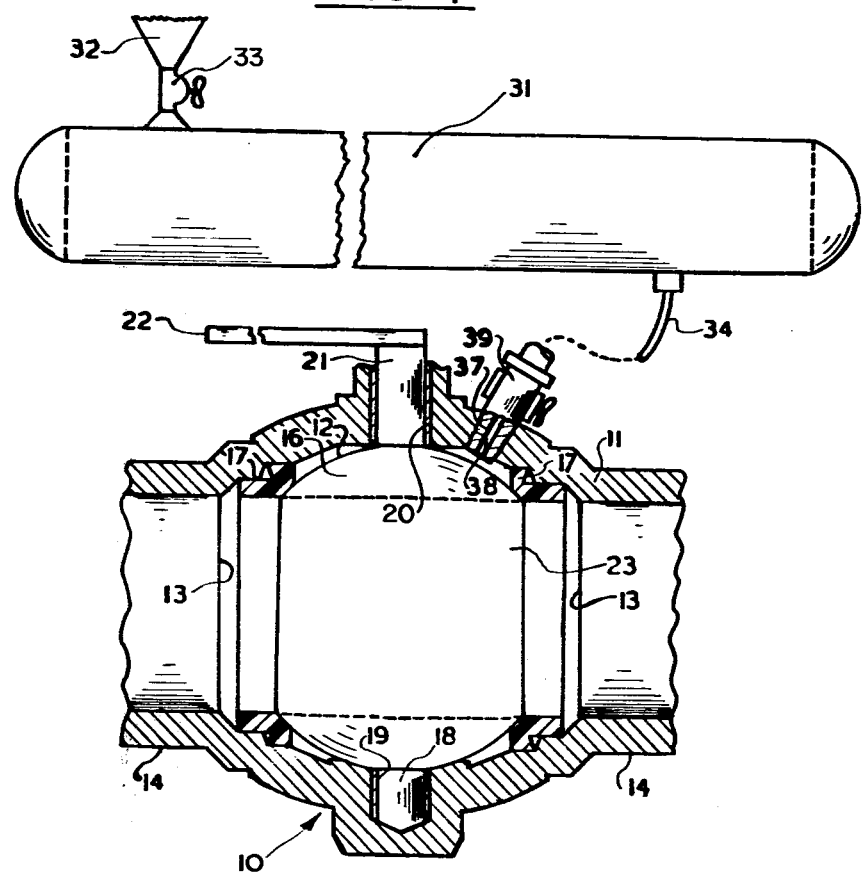

BALL VALVE LUBRICATING APPARATUS

BACKGROUND OF THE INVENTION

1. Field of the Invention

This invention relates to the ball valves for controlling the flow of natural gas through gas lines and, in particular, to lubricating means therefore.

2. Prior Art

Ball valves with which natural gas lines are usually fitted are usually only operated very infrequently. Consequently, the interior faces of the metal portions of the valve body and ball valve element which are always exposed to the gas are subject to corrosion which, after an extended period of time without movement, quite often results in seizure of the ball valve element making it difficult and, at times, impossible to open or close. Also, corrosion of metal parts quite often results in leakage after a frozen valve has been opened or closed.

SUMMARY OF THE INVENTION

The present invention provides a lubricating apparatus for ball valves which ensures a constant supply of lubricant to the valve and its working parts which, consequently, reduces chances of valve seizure and damage due to corrosion.

The lubricating apparatus of the present invention has a pressure vessel which is adapted to hold a quantity of lubricating fluid and adapted to be mounted above the valve and which has a pressure conduit descending therefrom and ported into the valve housing between spaced annular seals in the housing so as to enable the lubricating fluid to flow by gravity into the valve housing. The pressure conduit has a manually operated valve for closing the conduit to passage of lubricating fluid therethrough.

DESCRIPTION OF THE DRAWINGS

FIG. 1 is an elevation of lubricating apparatus of the invention connected to a gas line ball valve shown, partially, in section.

DETAILED DESCRIPTION

Referring to the drawing, the reference numeral 10 shows, generally, a ball valve of the type installed in lines for carrying gas under pressure ball valves, particularly thosed used in the control of gas lines, are of varied makes and configurations. However, regardless of a type or make of the ball valve, all ball valves have certain common characteristics. Accordingly, in ball valve 10, as hereinafter described and as shown in the drawings, only those characteristics which are common to all ball valves will be described. Details of construction relative to assembly are, consequently, omitted.

The ball valve 10 has a housing 11 having a substantially spherical chamber 12 having diametrically opposed circular ports 13—13 opening into stub connections 14—14 to which gas lines can be connected by means such as boltable flanges or by screw threaded unions. The valve also, characteristically, has a substantially spherical valve element 16 rotatably mounted within the chamber 12 between a pair of annular seals 17—17 seated in the chamber against the housing at each of the ports 13—13.

The valve element is supported centrally in the chamber by a stub shaft 18 which extends into a sealed socket 19 in the housing and has a hand operated operating shaft 21 which extends diametrically opposite the stub shaft 19 out of the housing through sealing element 20 and to which operating a handle 22 is secured by means of which the valve element can be rotatably positioned. The valve element also has a through passage 23 which, when arranged in an open position as shown in FIG. 1, enables passage of gas through the valve. The valve is closed by swinging the valve element through 90 degrees thus moving the valve element passage out of registry with the ports 13—13 of the chamber.

The lubrication apparatus of the present invention includes a pressure vessel 31 which can with-stand a pressure greater than line gas pressure and which has a filler assembly 32 closable by a hand operated valve 33 through which, when in an open position, lubricating fluid can be injected into the vessel. A high pressure conduit 34 is connected at one end to the bottom of the vessel and is connected at its opposite end to the housing through a fitting 37 which is threaded into a suitably tapped opening 38 in the housing, the opening being located between the annular seals. A manually operated valve 39 is included in the conduit above the fitting 37 to enable an operator to open or close the conduit.

The pressure vessel is mounted a sufficient distance above the ball valve to enable lubricating fluid to flow by gravity from the vessel into the ball valve.

In operation, with the pressure vessel filled or partially filled with lubricating fluid, the valve 33 is closed and the valve 39 opened. As there is usually a slight leakage of gas between the annular seals and the ball valve element, gas pressure in the pressure vessel gradually builds to gas line pressure. At the same time, lubricating fluid can flow from the pressure vessel into the housing chamber between the annular seals thus maintaining all metallic components of the ball valve lubricated which prevents corrosion and sticking of relatively movable parts. By reason of the closed pressure vessel, unit pressure of the lubricating fluid in the valve chamber will be substantially equal to the gas line pressure thus equalizing pressure on opposite sides of the annular seals. The seals are thus not subject to damaging effect of unequal pressures, a common occurrence in most valves of this type.

When it becomes necessary to refill the pressure vessel, lubricating fluid can be maintained in the ball valve by simply closing the valve 39 so as to enable the valve 33 to be opened to reduce pressure in the pressure vessel in order that it can be filled. When pressure vessel is filled, the valve 33 can be closed and the valve 39 re-opened.

I claim:

1. Lubricating apparatus for a ball valve for use in gas lines, the ball valve having a housing and a valve element located between spaced annular seals seating in the housing comprising:
   (a) an air tight pressure vessel for holding a lubricating fluid and being adapted to be mounted above the ball valve,
   (b) a high pressure conduit extending downwards from the bottom of the pressure vessel,
   (c) a fitting ported into the ball valve housing between the annular seals for connecting the conduit to the housing to enable the flow of fluid by gravity from the pressure vessel into the housing and flow of pressurized gas into the pressure vessel.

2. Lubricating apparatus as claimed in claim 1 including a manually operated valve in the pressure conduit for closing the pressure conduit to the passage of fluid and gas therethrough.

* * * * *